United States Patent [19]
Hube

[11] Patent Number: 5,337,161
[45] Date of Patent: Aug. 9, 1994

[54] TAB IMAGE EXTRACTION AND PLACEMENT

[75] Inventor: Randall R. Hube, Rochester, N.Y.

[73] Assignee: Xerox Corporation, Stamford, Conn.

[21] Appl. No.: 83,582

[22] Filed: Jun. 30, 1993

[51] Int. Cl.⁵ .............................................. H04N 1/40
[52] U.S. Cl. ..................... 358/448; 358/453; 382/45; 382/46
[58] Field of Search ............... 358/445, 449, 451, 452, 358/404, 444, 448, 453; 382/45, 46, 47

[56] References Cited

U.S. PATENT DOCUMENTS

| | | | |
|---|---|---|---|
| 4,674,864 | 6/1987 | Stakenborg et al. | 355/14 R |
| 4,745,441 | 5/1988 | Maruta et al. | 355/14 R |
| 4,819,029 | 4/1989 | Ito | 355/7 |
| 5,119,206 | 6/1992 | Rourke et al. | 358/450 |
| 5,191,429 | 3/1993 | Rourke | 358/450 |
| 5,210,622 | 5/1993 | Kelley et al. | 358/451 |
| 5,260,805 | 11/1993 | Barrett | 358/451 |

Primary Examiner—Edward L. Coles, Sr.
Assistant Examiner—Jerome Grant, II
Attorney, Agent, or Firm—Oliff & Berridge

[57] ABSTRACT

An electronic reprographic printing system that extracts a tab image from a print job, document or memory for printing on tab stock. The extracted tab image can be rotated, shifted and scaled accordingly, to be printed in the tab area of a sheet of tab stock. Depending upon the cut of tab stock, the tab image is designated to be placed on a particular occurrence of a tab in a sequence of tabs. The tab images are stored sequentially in the system memory and may be edited as required. The print job including the tab images can be printed in its entirety.

28 Claims, 20 Drawing Sheets

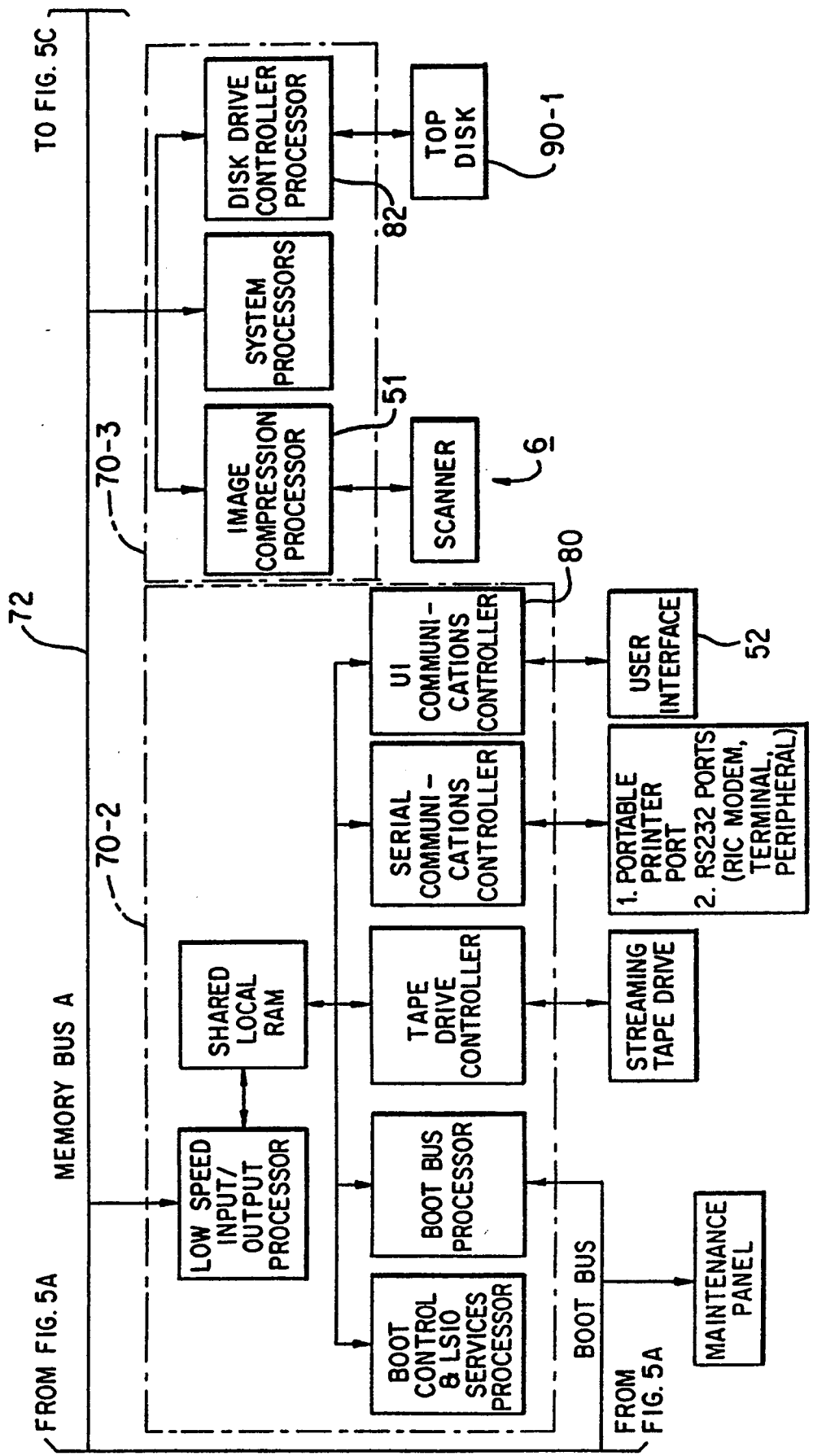

TAB IMAGE EXTRACTION AND PLACEMENT

BACKGROUND OF THE INVENTION

1. Field of the Invention

The present invention relates to an electronic reprographic printing system that is capable of extracting an image from a print job for printing on tab stock.

2. Description of the Related Art

Current printing systems are capable of shifting an image before printing on the output stock of a print job. These printing systems commonly shift the scanned images of documents in a print job a standard distance, for creating, for example, sufficient margins for binding the final product. Copying machines are also capable of forming set margins when printing on both sides of a duplex page. The process involves shifting the image in one direction on a first side and shifting the image in the opposite direction on the second side. Image shifting devices are also capable of shifting the scanned image of a document on copying paper, depending on the direction of conveyance of the copying paper. These systems commonly shift the image a preset standard distance for the entire print job. In all of the current printing systems that are capable of shifting an image, a master must be created that contains the image positioned for shifting.

The related art discloses printing systems that allow for shifting of an image during copying.

U.S. Pat. No. 4,674,864 to Stackenborg et al. discloses a reproduction device which includes a method for programming the width of an image-free edge zone on a copy sheet. By pressing a particular button on the control panel, the width of an image free edge zone can be adjusted at the left and right hand sides of a copy sheet to correlate the size of an original with the size of a selected output stock.

U.S. Pat. No. 4,745,441 to Maruta et al. discloses a copying machine that forms filing margins on both sides of a copy sheet by shifting a reduced version of the image from an original. The optical system scanning the original is shifted a predetermined distance away from its normal position for placing an image onto a copy sheet within the predetermined margins.

U.S. Pat. No. 4,819,029 to Ito discloses a copying machine with an image shift function that provides a defined filing margin on a copy sheet by shifting the transfer position of a document image to one edge of a copy paper. U.S. Pat. No. 5,210,622 to Kelley et al. discloses an electronic reprographic printing system that applies a special image shift to particular documents of a print job based on the difference between the size of the input stock that is scanned and the size of the output stock onto which the image is transferred. One use of such image shifting is the generation of tab pages from image masters that are not created on the same width as the tab stock on which the printing will ultimately be done.

In general, image shifting across an entire print job or even specialized image shifting, which variably shifts an image based on the difference between the size of the input and output stock, lacks flexibility and efficiency when used to make tabs. One problem is that to print the image in the desired location, the user must properly position the tab's image prior to scanning the image. For example, a tab master must be created, prior to shifting, on a separate sheet that includes only the tab image, positioned and oriented, to be shifted and printed on output tab stock. Another problem is that the images are scanned as pages so that when a tab image is shifted, the entire page image is shifted. Another problem with specialized image shifting is that the amount of the image shift depends upon detecting size differences in the input and output sheet.

Yet another problem occurs in the printing of a sequence of tabs. Reordering a sequence of tabs involves changing the tab master as well as all the other tab masters. Still further, when a document has been created without tabs and tabs are to be added as an afterthought, the user must go back through the whole process of creating tab masters and recreate the tab job.

While the related art recognizes image shifting for creation of tabs within a print job, a flexible and improved system is needed that allows for the selective extraction of images from anywhere within a print job, document or a memory of stored images and then variably rotates, scales, and applies the images in accordance with a desired output position and orientation of a particular tab stock (sheet or media). A system is needed that further stores the selected tab images sequentially in memory, therefore enabling the user to insert and delete tab images easily. Finally, the pages requiring tab stock in a print job are automatically printed in their proper order within the print job with their tab image on the tab (or tab extension).

OBJECTS AND SUMMARY OF THE INVENTION

Accordingly, one object of the present invention is to provide an electronic reprographic printing system that enables an operator to extract images from a source for positioning and printing on tab stock.

Another object of the present invention is to provide an electronic reprographic printing system that can transform an extracted image for accurate placement on a tab.

Another object of the present invention is to provide an electronic reprographic printing system that can transform the extracted images linearly, rotationally, and dimensionally for accurate placement on a tab.

Another object of the present invention is to provide an electronic reprographic printing system that anticipates the final position, image size and orientation of the extracted images for placement on a tab based on simple input information.

Another object of the present invention is to provide an electronic reprographic printing system that can position an extracted image for placement on a tab for both standard and custom tab stock.

Another object of the present invention is to provide an electronic reprographic printing system where the extracted images are in a sequence for printing on tab stock and can be shuffled or re-ordered easily.

Another object of the invention is to provide an electronic reprographic printing system that can extract tab images having dimensions greater than the dimensions of the tab.

Another object of the invention is to provide an electronic reprographic printing system that can extract tab images having dimensions different than the dimensions desired on the tab.

Yet another object of the invention is to provide an electronic reprographic printing system that can generate, for example, tab labels without advance creation of individual tab page masters.

The present invention relates to the production of tab images by selecting from a supply of image data the images desired for printing on the tab portion of tab stock. The extracted tab image is transformed in accordance with the dimensions and orientation of the tab and requirements of the user. The information for transforming the tab images is stored in system memory. The invention further includes the capability of editing the tab sequence. The system prints the entire print job including the tab images being printed on the appropriate sheet of tab stock.

BRIEF DESCRIPTION OF THE DRAWINGS

The foregoing and other objects, features and advantages of the invention will be apparent from the following more particular description of the preferred embodiments of the invention, as illustrated in the accompanying drawings wherein:

FIGS. 5a, 5b and 5c comprise a schematic block diagram showing the major parts of the control section for the printing systems shown in FIG. 1;

DETAILED DESCRIPTION OF PREFERRED EMBODIMENTS

A. The System

Figure 1:
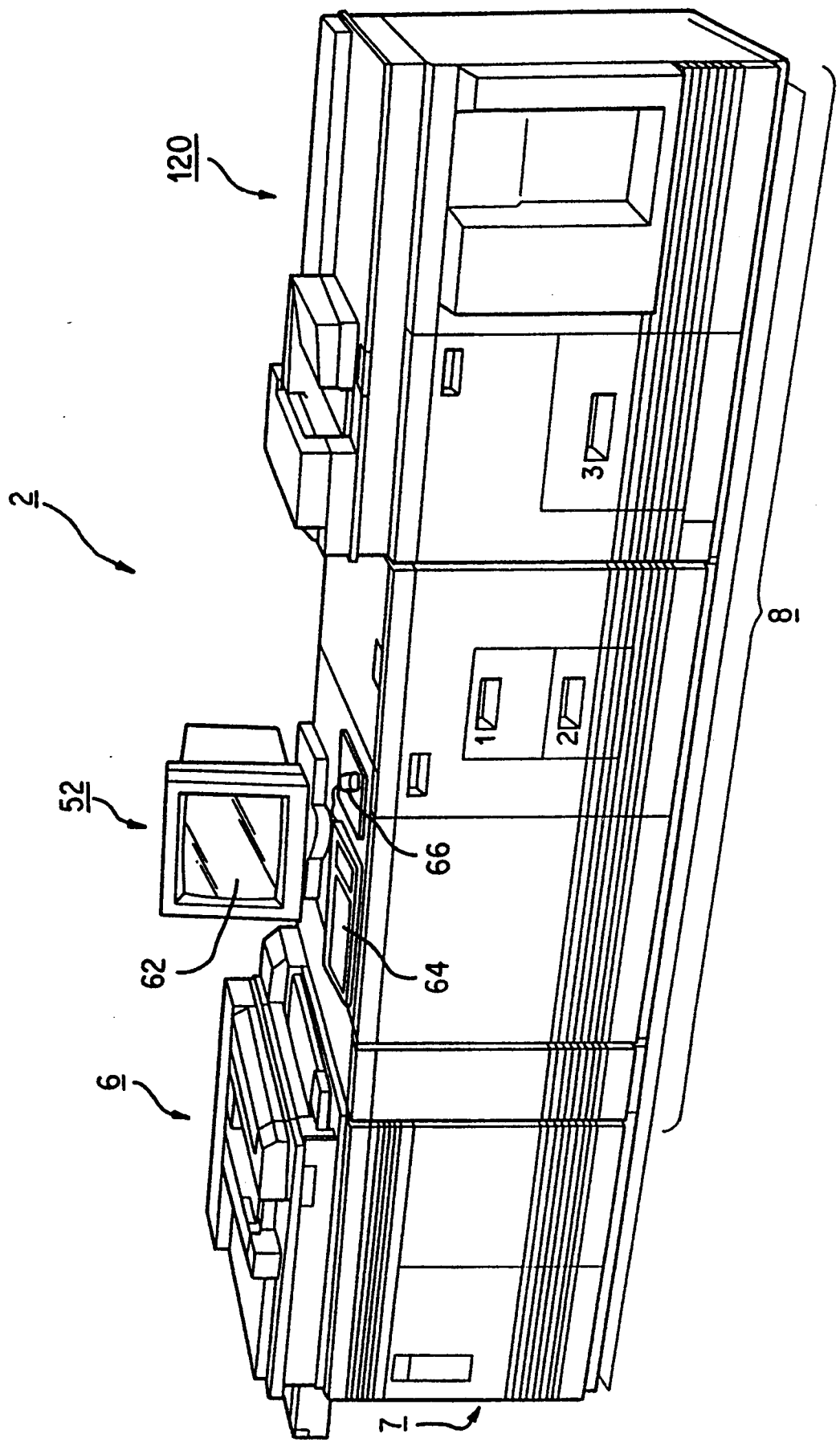
FIG. 1 is a view depicting an electronic printing system incorporating the tab image selection, extraction, transformation, storage, and placement system of the present invention.
Figure 2:
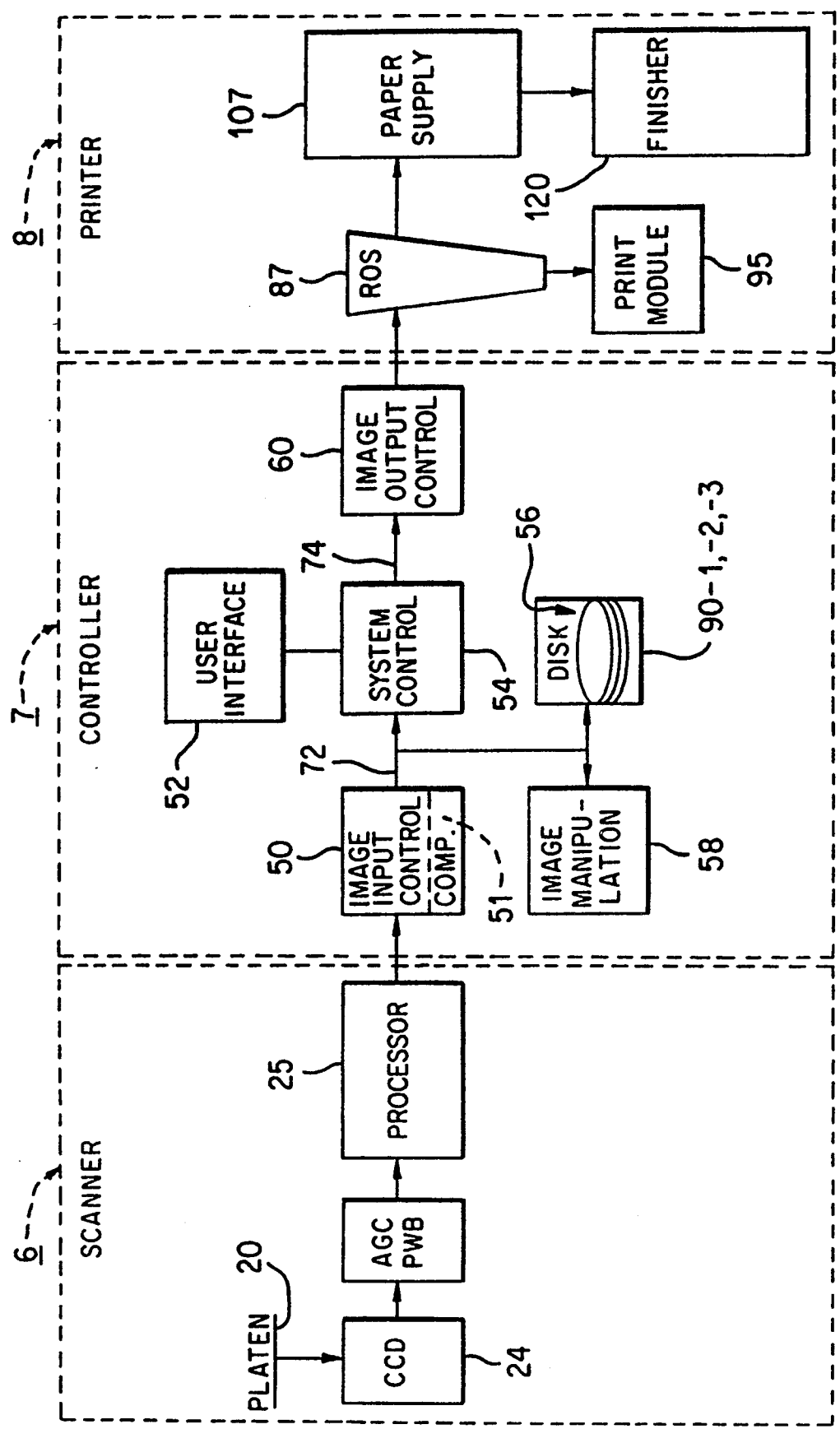
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
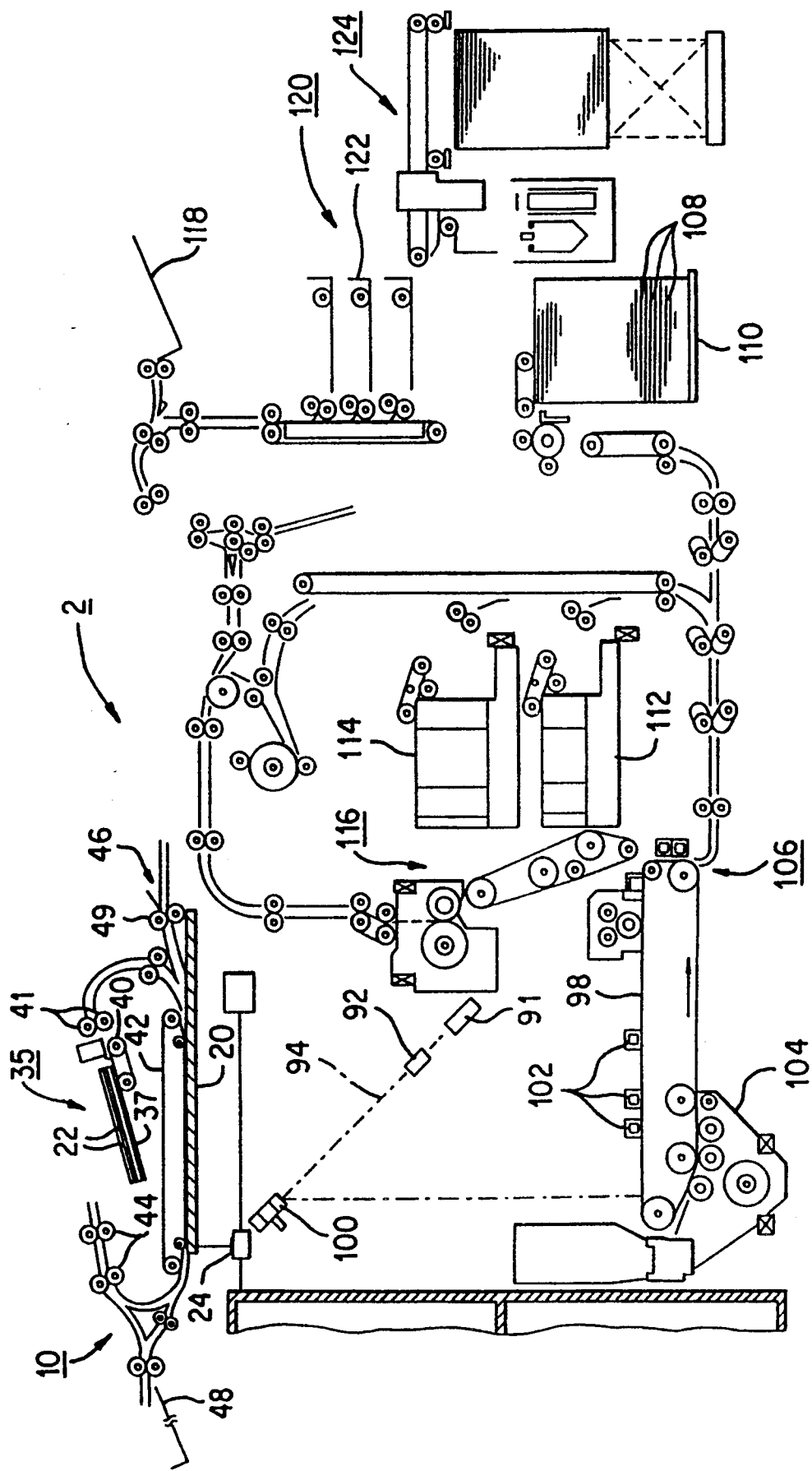
FIG. 3 is a plan view illustrating the principal mechanical components of the printing system shown in FIG. 1.
Figure 4:
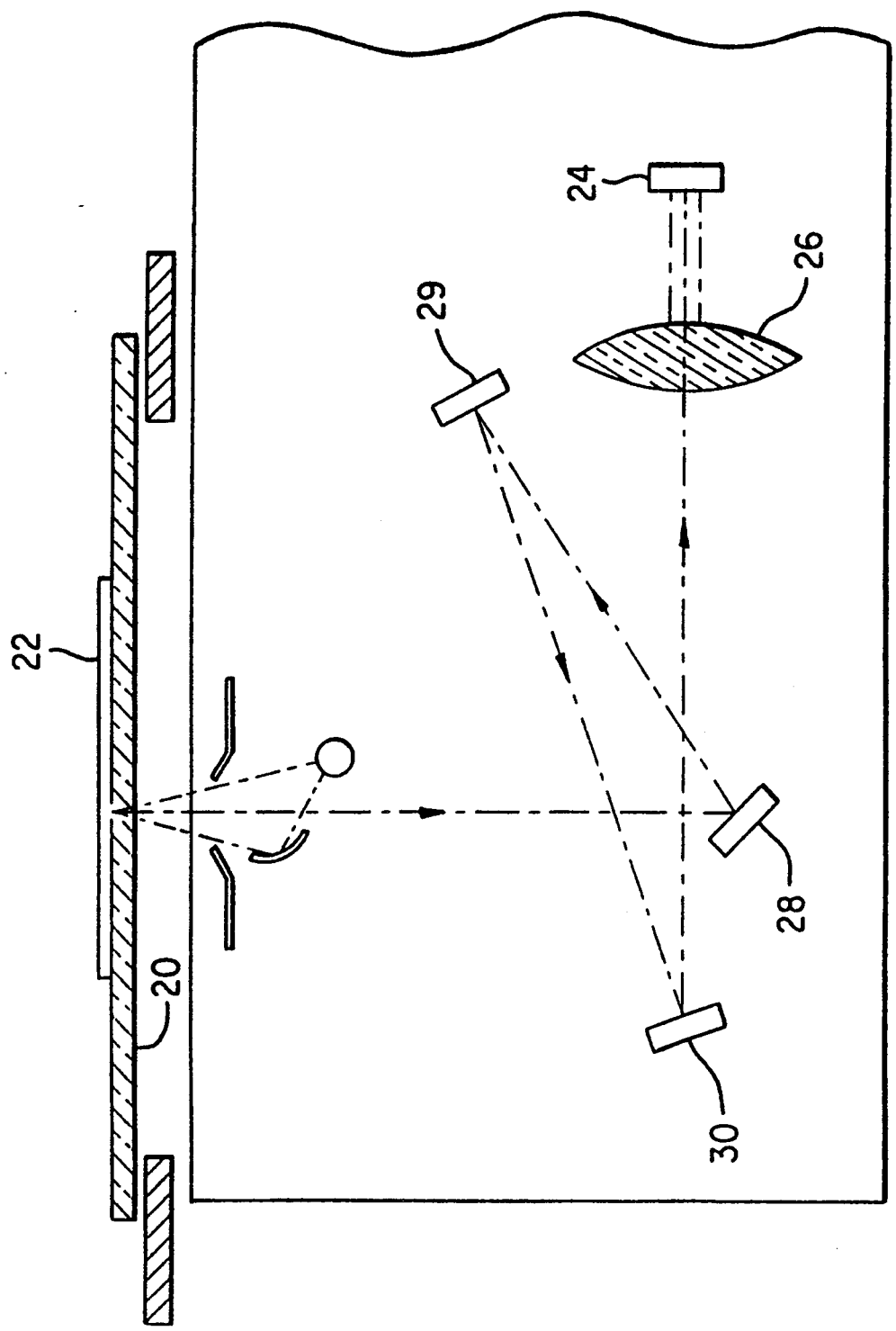
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on plate 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and crate the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 24 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
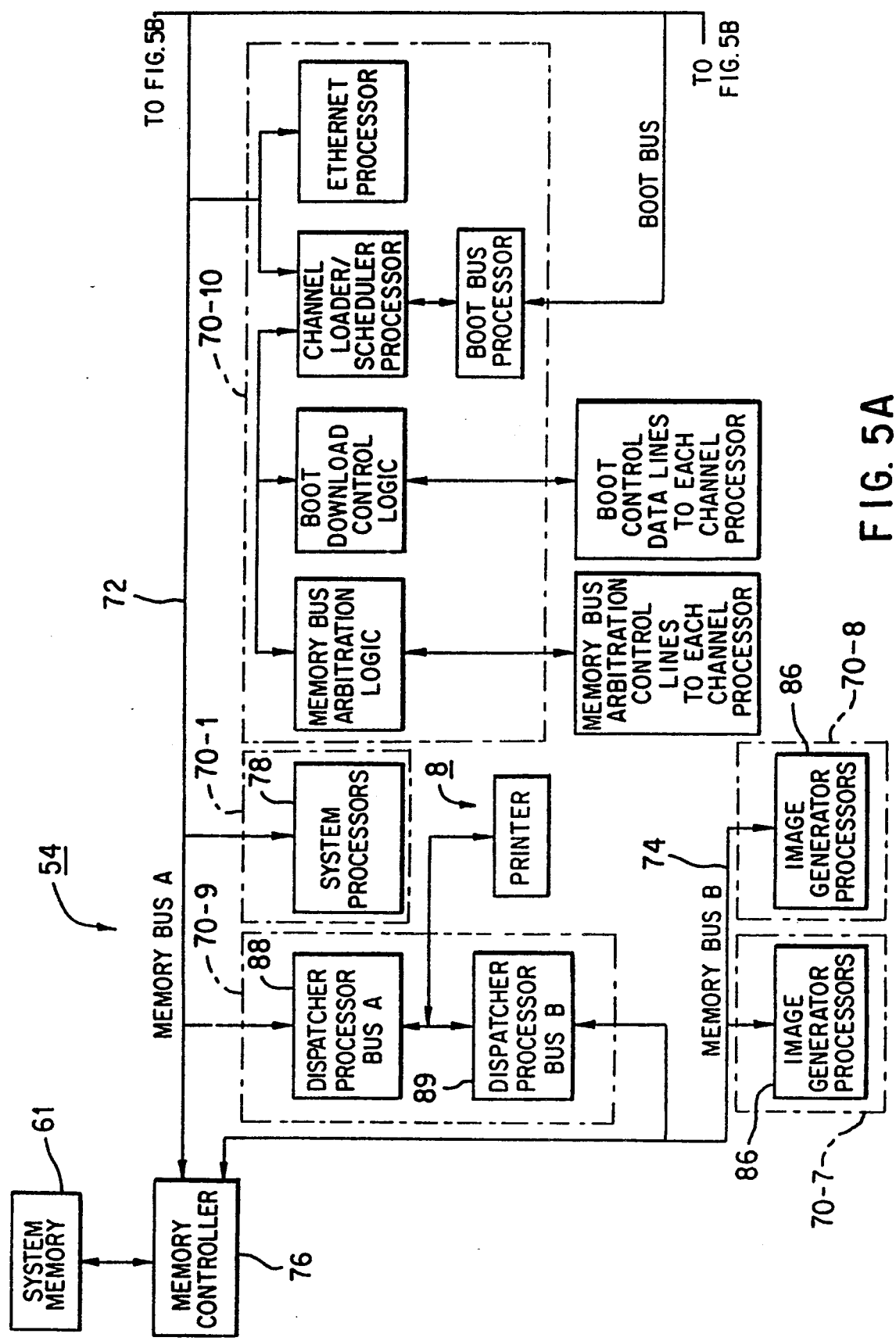
Figure 5C:
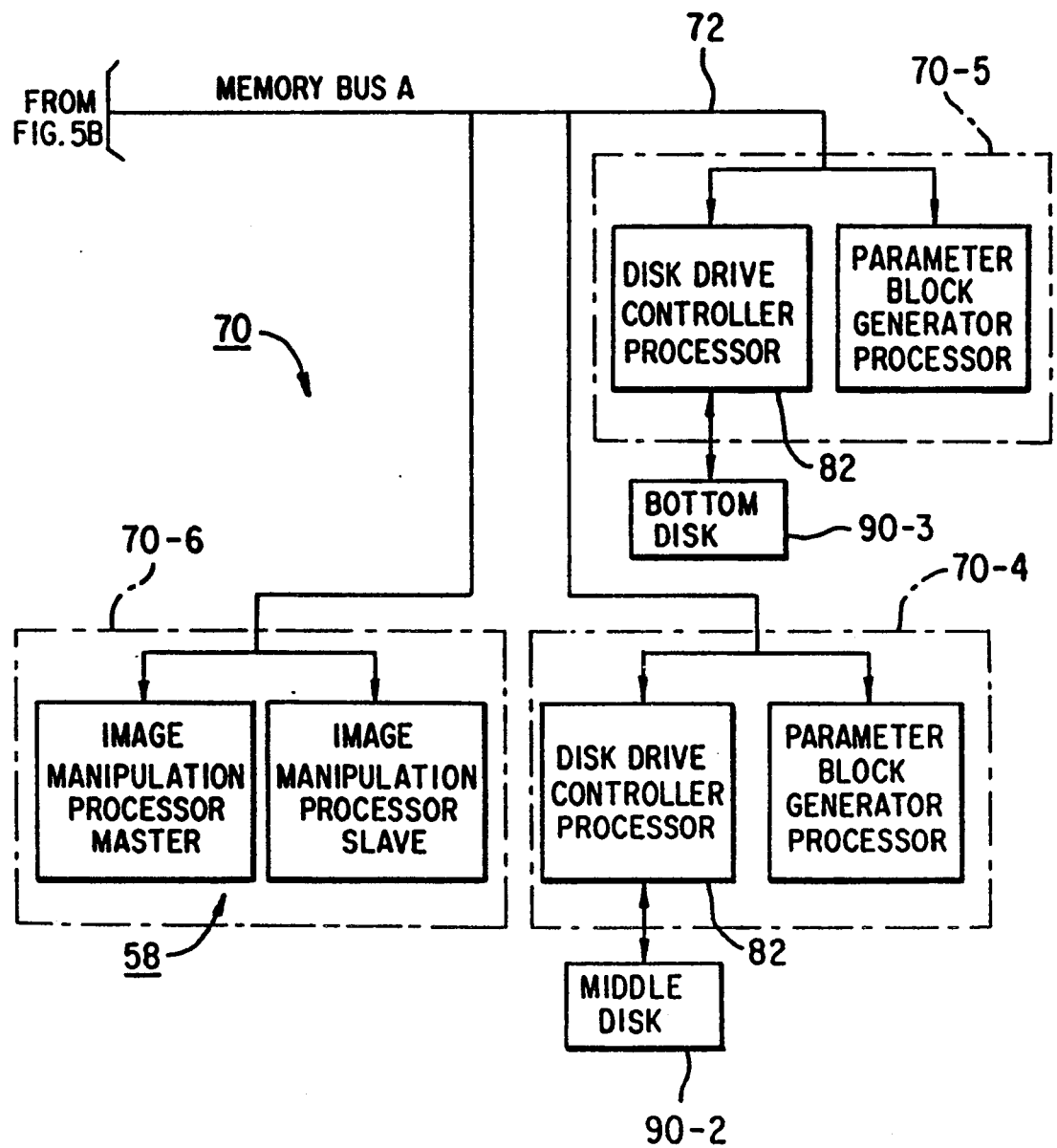

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 7010.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
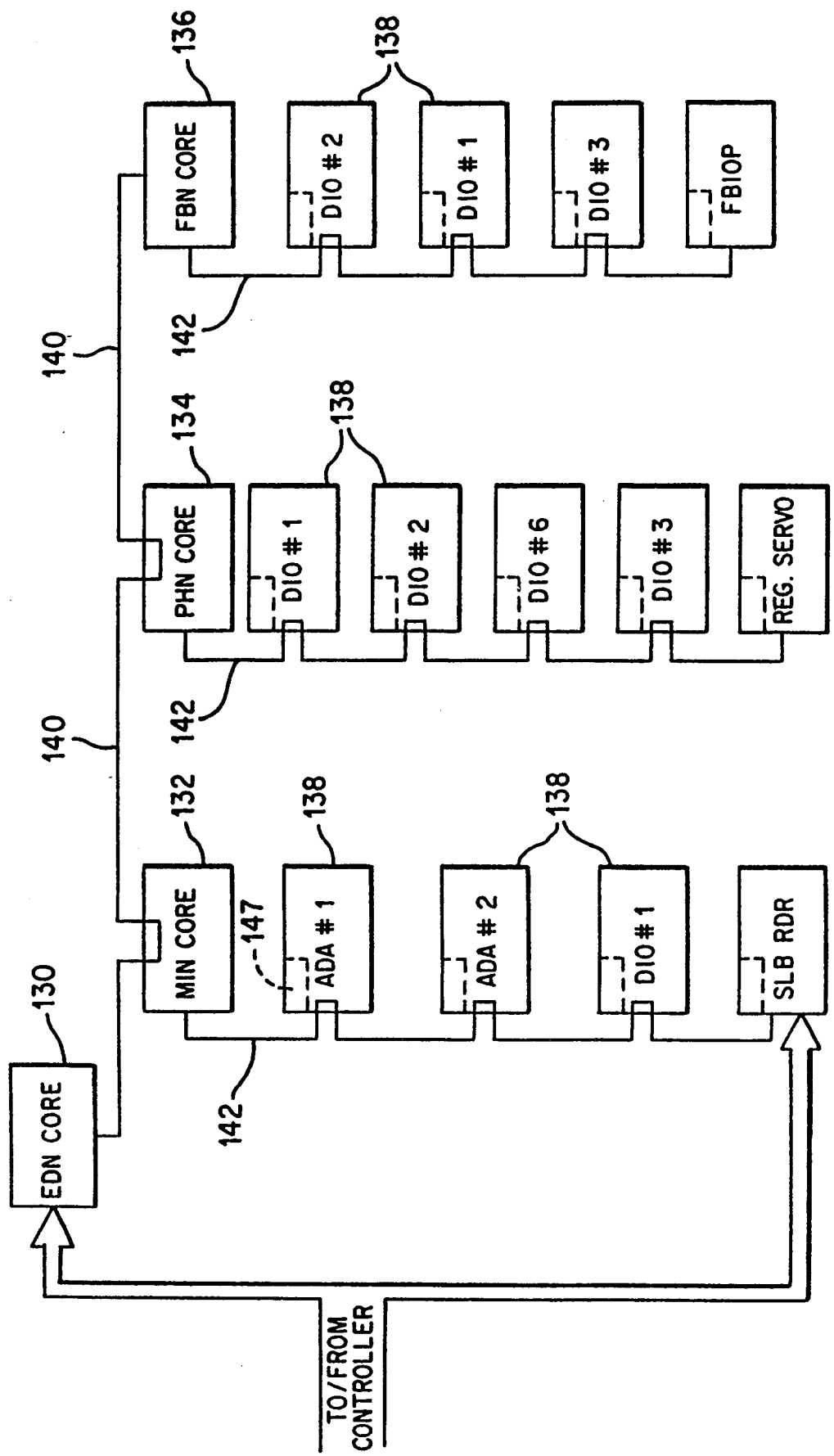
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
FIG. 7 is a view depicting an exemplary job programming ticket and job scorecard displayed on the User Interface (UI) touchscreen of the printing system shown in FIG. 1.
Figure 8:
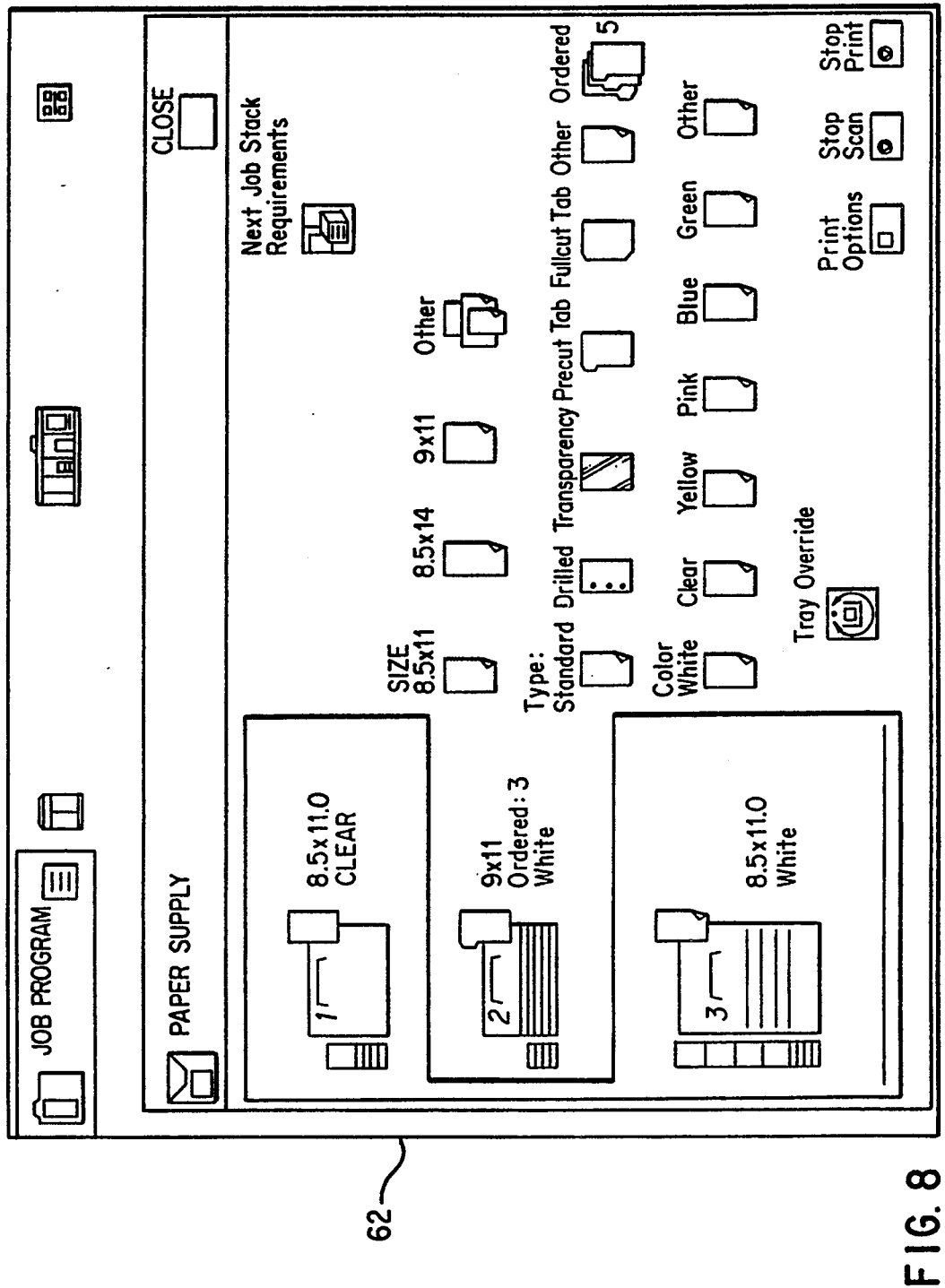
FIG. 8 shows an embodiment of a User Interface touchscreen for selecting output stock.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. FIG. 8 shows for purposes of illustration an example of a touchscreen 62 from the user interface 52. On this paper supply screen, the size, color and type of stock for the print job can be selected.

B. Tab Image Transformation

Figure 9:
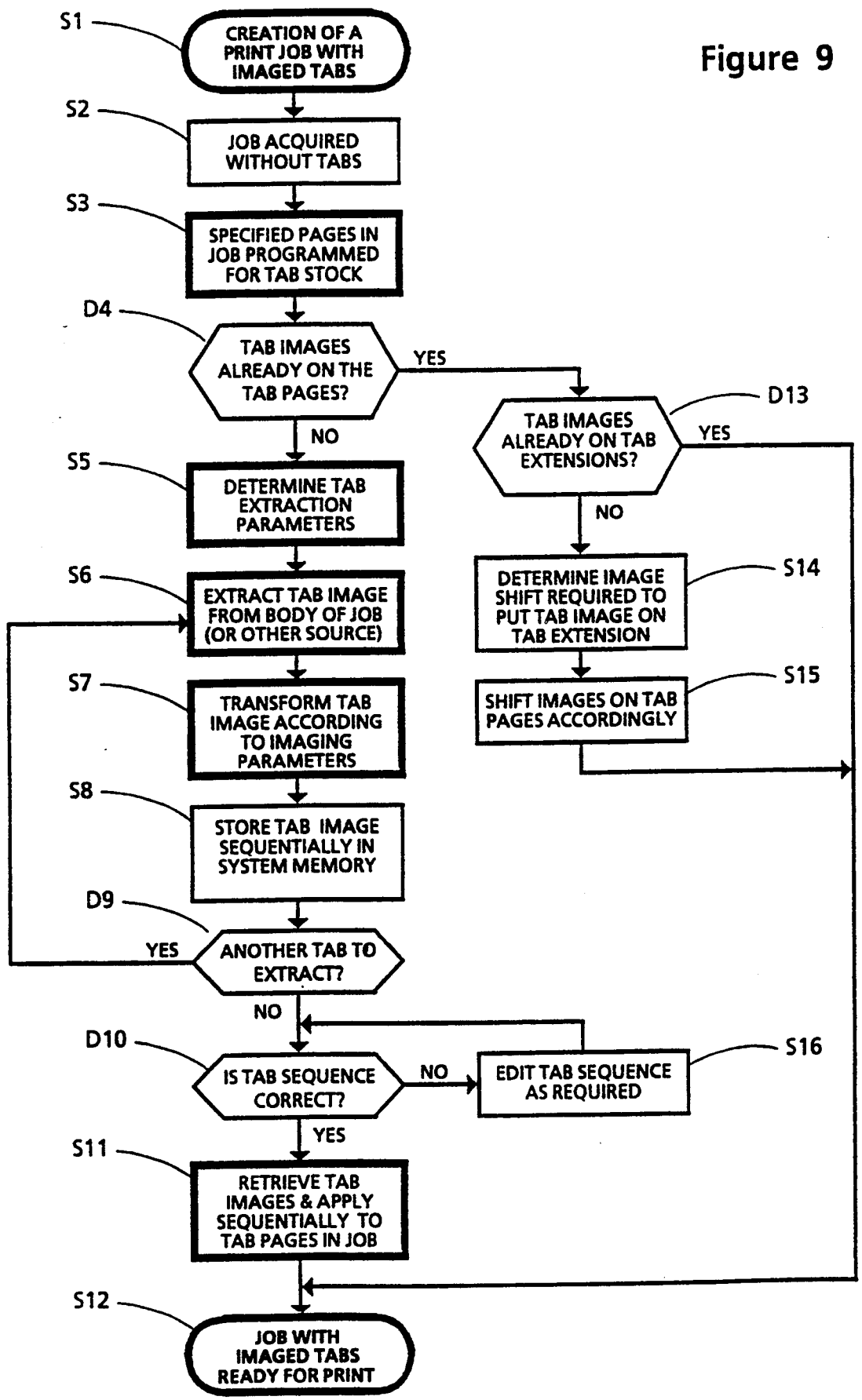
FIG. 9 is a flowchart showing the creation of a print job with tab images in accordance with the present invention.
Figure 10:
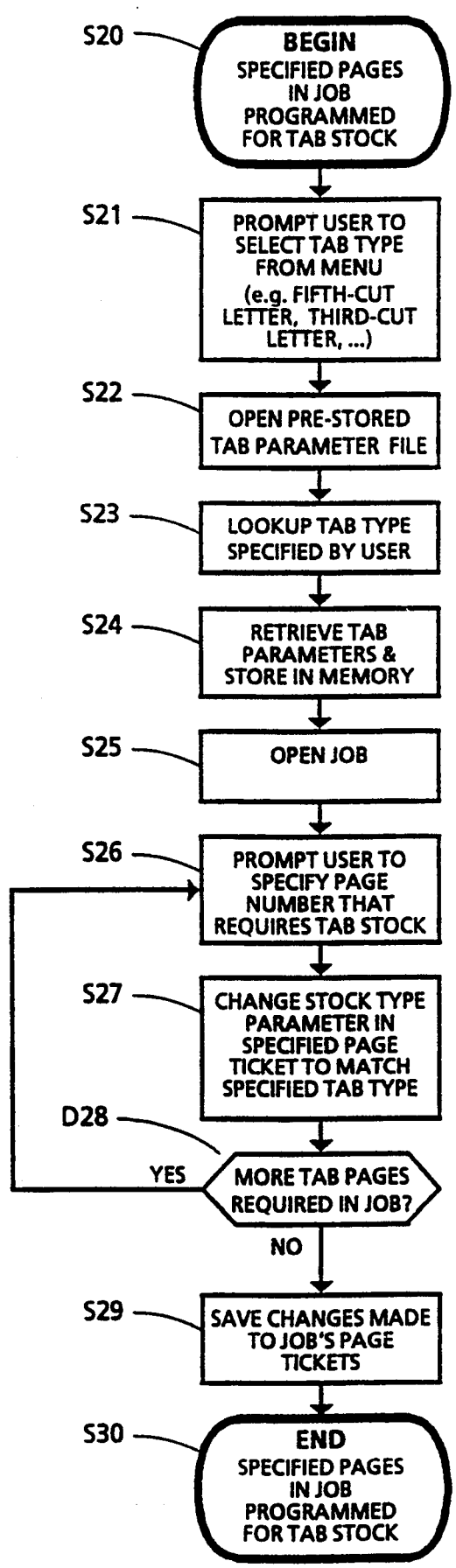
FIG. 10 is an expansion of the S3 step shown in FIG. 9.

FIG. 9 shows an embodiment of the creation of a print job having tab images in accordance with the invention. The user, for example, at the user interface 52, selects to create a print job that will include tab images (S1). Accordingly, the print job is acquired without tab images (S2), at least in part. At this point, the user can specify pages in the print job to be programmed as tab stock (S3). FIG. 10 shows the operation of specifying the pages in a print job to be programmed for tab stock (S3/S20). The user selects a tab type from a menu. For example, the user would select fifth-cut letter or third-cut letter tab stock. The cut of the tab indicates the size of the individual tabs and, generally, indicates the number of tabs in a sequence before the tabs repeat. For example, fifth-cut letter tabs usually have five tabs in a series before the tabs begin to repeat locations. Then, a pre-stored tab parameter file is opened (S22). It is within the scope of the invention for the user to create a custom tab stock and have the parameter file include the parameters of the custom tab stock specified by the user. The tab parameters for the tab type specified are retrieved (S23) and stored in memory (S24). The tab parameter file includes necessary tab type information such as the modulus parameter, which represents the number of instances of tab stock that are found in a tab sequence before the pattern repeats, the maximum tab image width, the maximum tab image height, the vertical center line for each tab position, and the horizontal center line for each tab position.

Generally, the number of unique instances of tab stock found in one run of the pattern will equal the modulus. For example, third cut tab stock usually contains three unique instances of tab stock that are presented sequentially in a pattern that repeats every three sheets (e.g., first-third position, second-third position, and third-third position). However, it is possible to construct tab stock patterns that utilize fewer tabs in a series by using a standard cut tab stock. For example, using third-cut tab stock, a pattern could be created that includes only two tabs in a series before the tab pattern repeats by using only two of the three positions of tabs. It is also possible to create tab series containing multiple occurrences of particular tab positions within a single series of a tab pattern. For example, using standard third-cut tabs where the modulus is equal to 6, to create a series where the order is first-third, first-third, second-third, second third, third-third, third-third.

The following example of a tab parameter file is provided for purpose of illustration:

| EXAMPLE: TAB PARAMETER FILE | |
|---|---|
| TYPE = FIFTH-CUT LETTER | |
| MODULUS = 5 | 5 tabs in pattern |
| XMAX = 0.500 | max. tab image width |
| YMAX = 2.200 | max tab image height |
| XCL (1) = 8.250 | 1st tab's vert. centerline |
| YCL (1) = 9.900 | 1st tab's horiz. centerline |
| XCL (2) = 8.250 | 2nd tab's vert. centerline |
| YCL (2) = 7.700 | 2nd tab's horiz. centerline |
| XCL (3) = 8.250 | 3rd tab's vert. centerline |
| YCL (3) = 5.500 | 3rd tab's horiz. centerline |
| XCL (4) = 8.250 | 4th tab's vert. centerline |
| YCL (4) = 3.300 | 4th tab's horiz. centerline |
| XCL (5) = 8.250 | 5th tab's vert. centerline |

| -continued | |
|---|---|
| EXAMPLE: TAB PARAMETER FILE | |
| YCL (5) = 1.100 | 5th tab's horiz. centerline |
| TYPE = THIRD-CUT LETTER | |
| MODULUS = 3 | 3 tabs in pattern |
| YMAX = 0.500 | max. tab image width |
| YMAX = 3.666 | max. tab image height |
| XCL (1) = 8.250 | 1st tab's vert. centerline |
| YCL (1) = 9.166 | 1st tab's horiz. centerline |
| XCL (2) = 8.250 | 2nd tab's vert. centerline |
| YCL (2) = 5.500 | 2nd tab's horiz. centerline |
| XCL (3) = 8.250 | 3rd tab's vert. centerline |
| YCL (3) = 1.833 | 3rd tab's horiz. centerline |

The print job to be programmed with tab stock is then opened (S25). Once the print job is opened, the user specifies the page number(s) in the print job that will require tab stock (S26). Then, the stock type, as recorded in a page ticket for a specified page image is changed to match the specified tab type (S27). The page ticket refers to the data structure that contains page-level programming parameters, such as, type of stock, color of stock, page-level image shifts, and simplex/duplex printing. Therefore, every page in a print job may have its own unique page ticket. For each page that requires a tab (D28), steps S26 and S27 are repeated. When completed, the changes made to the print job page tickets are saved (S29).

Figure 16:
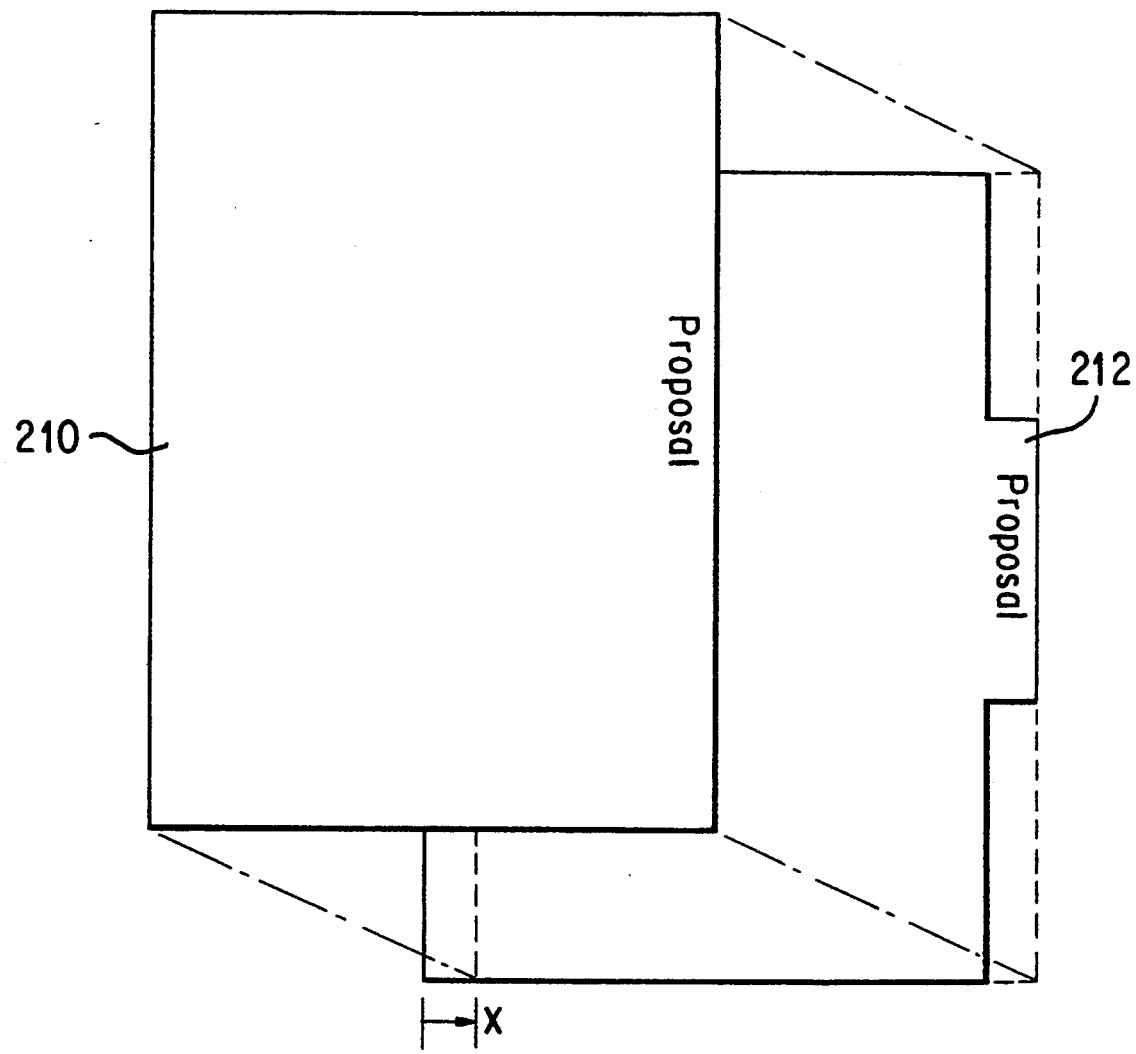
FIG. 16 shows a conventional image shift for printing on tab stock.

If the tab images are already on the tab pages (D4) and the tab images are already on tab extensions, (D13) then the job is ready for printing. Similarly, if the tab images are already on the tab pages (D4), but the tab images are not already on the tab extensions (D13), then image shifting is used to put the tab image on the tab extension (S14 and S15). One preferred method of image shifting is shifting the image based on the difference between the size of the input stock that is scanned and the size of the output stock onto which the image is transferred as disclosed in U.S. Pat. No. 5,210,622 to Kelley et al., the disclosure of which is herein incorporated by reference. FIG. 16 illustrates this method for applying tabs. With this method, a tab master 210 must be used with the tab image in its final vertical position along the edge of the tab master. Then, the necessary image shift (x) to print the tab image on the tab extension 212 is applied.

Figure 11:
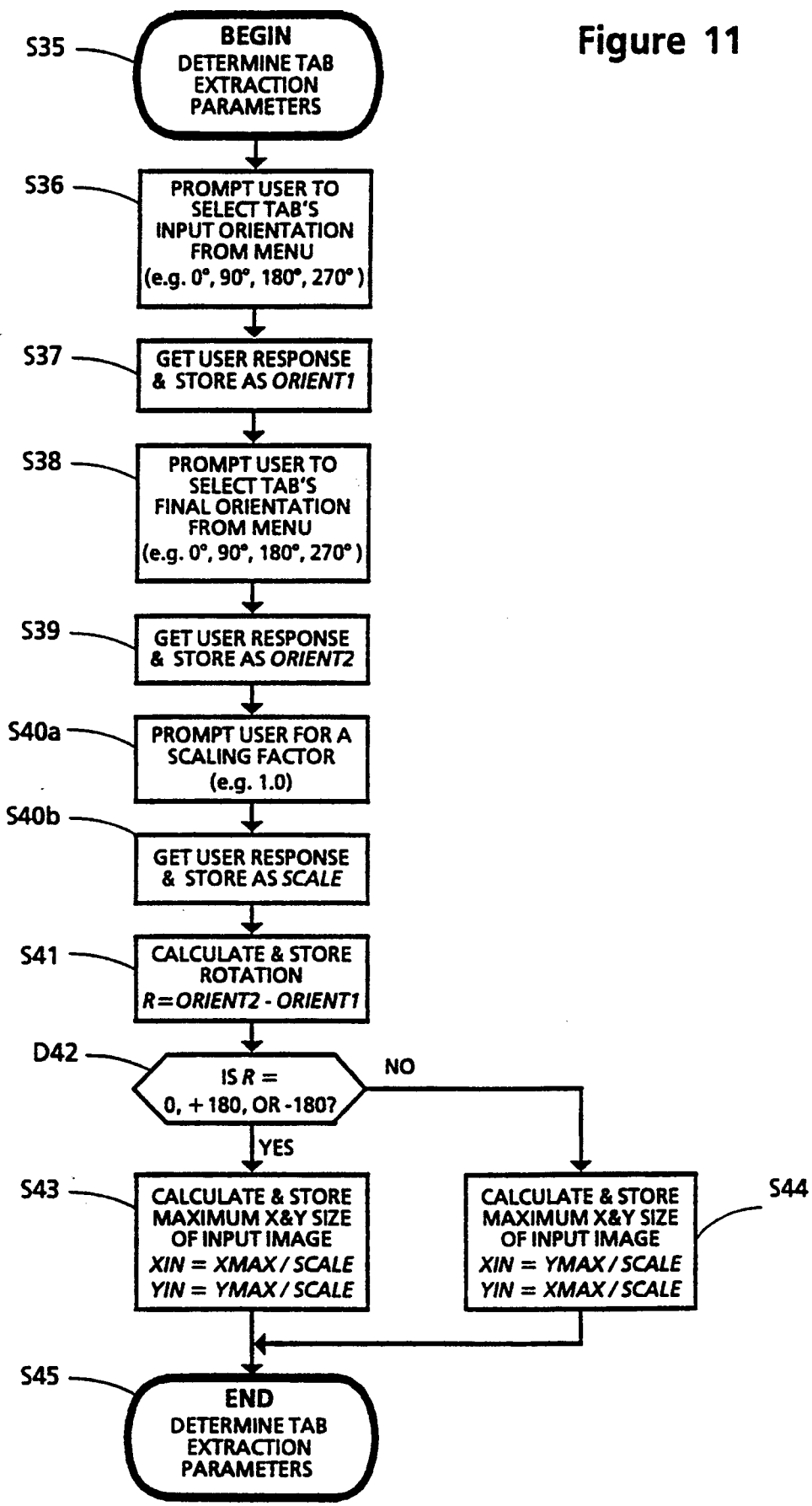
FIG. 11 is an expansion of the S5 step shown in FIG. 9.
Figure 17:
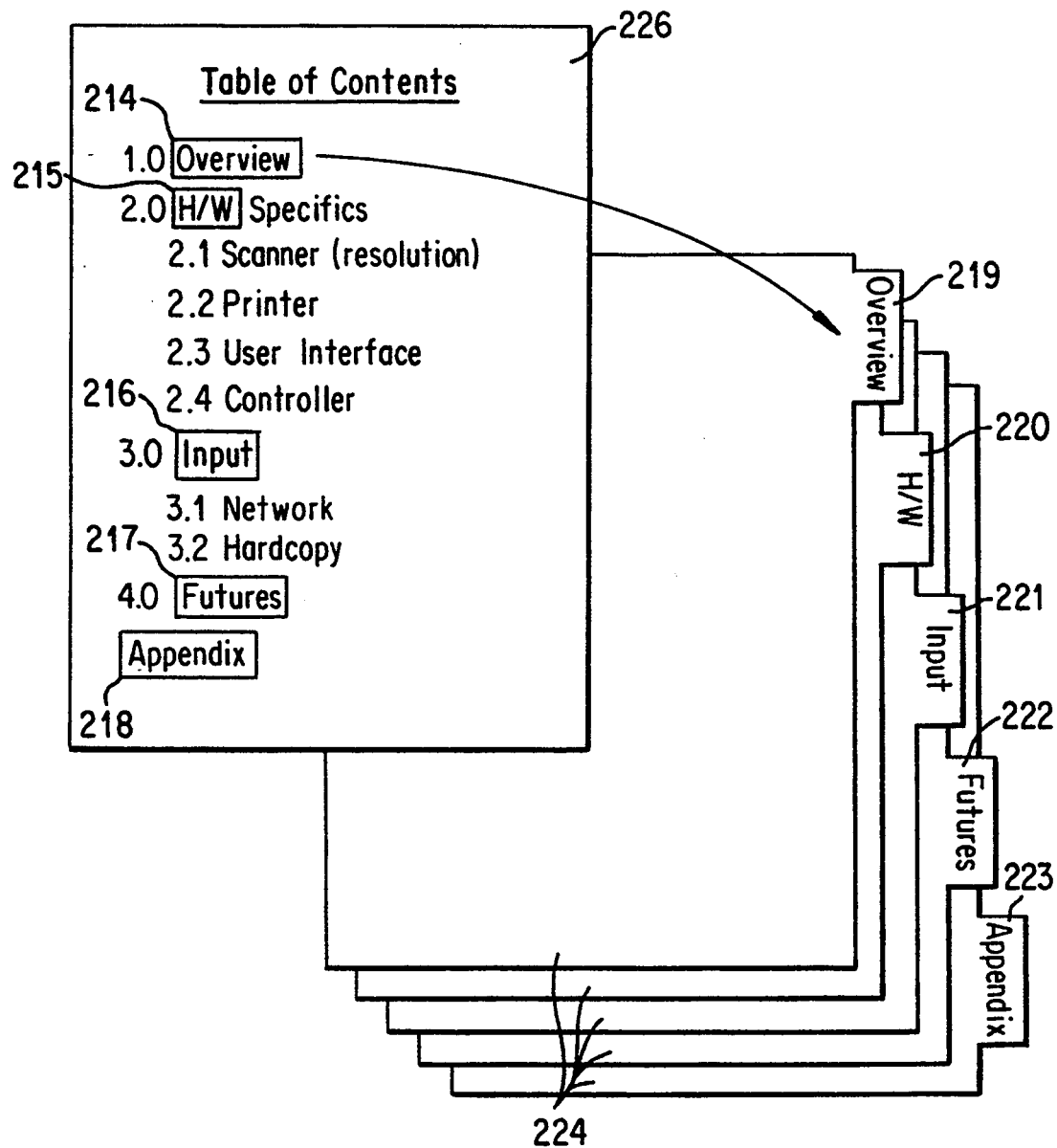
FIG. 17 shows the application of tabs in accordance with the present invention.
Figure 18:
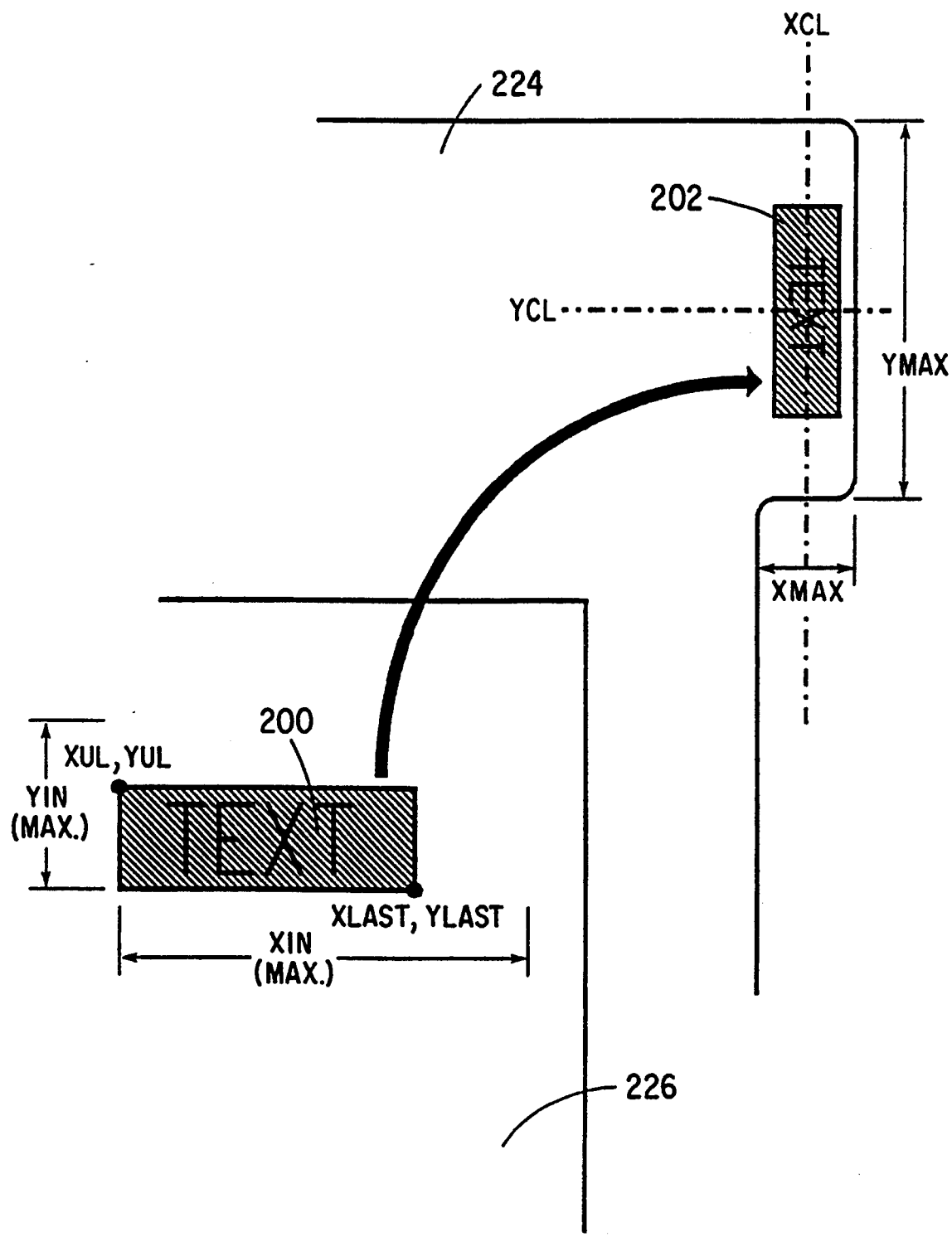
FIG. 18 shows the selection, transformation, and placement of a tab image in accordance with the invention.

In accordance with the invention as shown in FIG. 17, the user can select and extract any tab image (214–218) for printing on a designated tab extension (219–223). As shown, again in FIG. 17, a tab image from any page (226) or a combination of pages in the print job can be selected and positioned for printing on any particularly designated tab extension in a series of tab extensions. To do so, the tab extraction parameters (S5) must be determined. As expanded from step S5 in FIG. 9, FIG. 11 shows the steps for determining the parameters for the extraction of a tab image (S35). The user selects the tab image input orientation from a menu (S36). The orientation is based on the position of a tab image in relation to coordinate x-y axes. With respect to the coordinate axes as defined by the system, the input and output directions of the tab image preferably include 0°, 90°, 180° or 270°. FIG. 18 shows for purposes of illustration, an input tab image with an orientation of 0°. The input orientation is stored as ORIENT 1 (S37). The user then selects the tab image's final orientation (S38), and it is stored as ORIENT 2 (S39). FIG. 18 illustrates an embodiment of this transformation. In this embodiment, input tab image 200 represents the tab image selected from the print job. Again, as shown in the Figure, ORIENT 1 is equal to 0°. The final tab image 202 is transformed for placement on the tab based on a final orientation, ORIENT 2 with an orientation of 90°. The user is prompted to select a scaling factor (S40a). For example, a scaling factor of 1.0 would retain the same dimensions as the input tab image (i.e. not require scaling). In FIG. 18, the scale factor was selected as 0.67, thereby reducing the final tab image 202 by 33%. The scale factor is stored as SCALE (S40b).

To determine the amount of rotation necessary to place the final tab image on the tab, the rotation is calculated and stored (S41). The rotation is equal to ORIENT 2 minus ORIENT 1. If the rotation is equal to 0°, +180° or −180° (D42), then the maximum x and y size of the input image (XIN, YIN) is calculated and stored as follows:

XIN=XMAX/SCALE

YIN=YMAX/SCALE

If the rotation does not equal 0°, +180°, or −180°, then the maximum x and y size of the input image (XIN, YIN) is calculated and stored (S44) as follows:

XIN=YMAX/SCALE

YIN=XMAX/SCALE

Determination of the tab image extraction parameters are then complete (S45).

Figure 12:
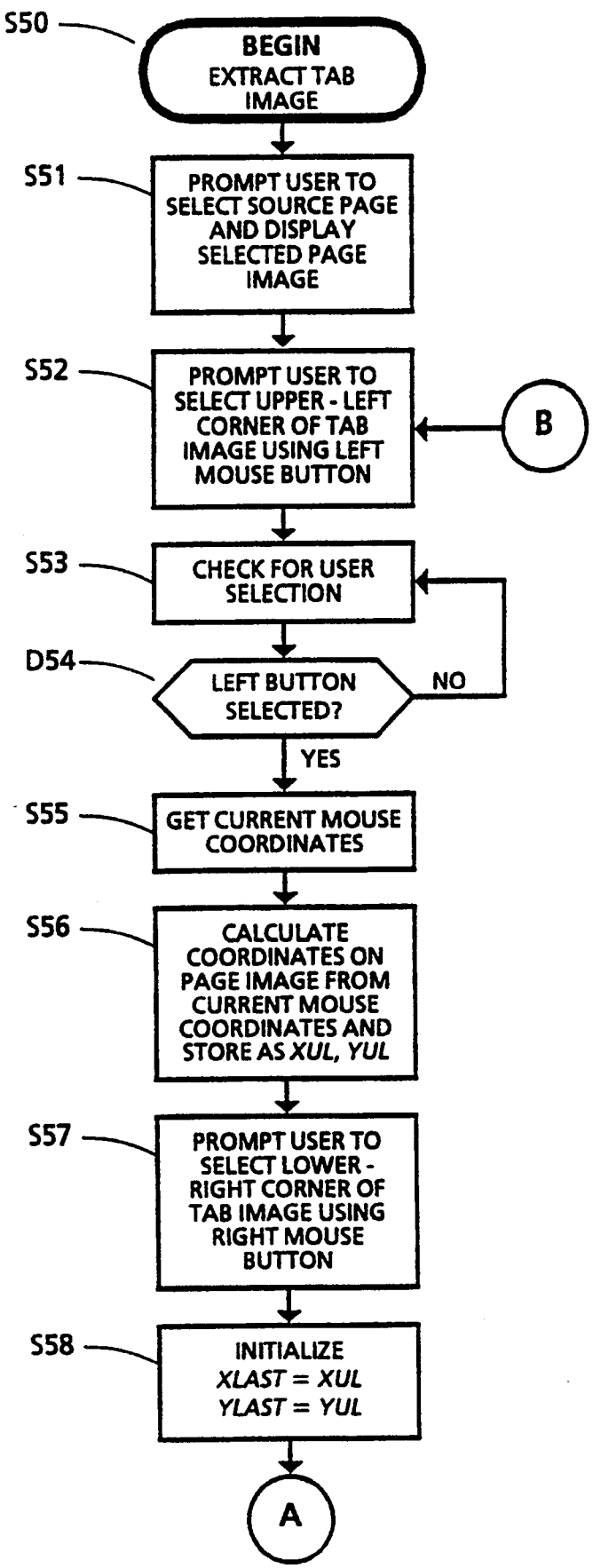
FIG. 12 is an expansion of the S6 step shown in FIG. 9.

The tab images are extracted from the print job (S6) by the user defining a tab image area. In one embodiment the user selects two opposing corners to define a box that surrounds the tab image area. Then the system highlights the selected tab image area, for example, by applying an outline, a shading, a colored background or another visual distinction to the area being selected. This is illustrated in further detail in FIG. 12 beginning with step S50. To begin, the user selects and displays a source page image from the print job (S51). The user defines the tab image by selecting an upper-left corner of the tab image using, for example, a mouse button (S52). FIG. 18 illustrates this selection as coordinate (XUL, YUL). The user selection can be checked (S53) to make sure the left button was selected (D54). If it was not, again, the user will be able to select the upper-left corner of the tab image. Once the upper-left corner of the tab image has been selected, the mouse coordinates are used to calculate the coordinates in recitation to the page image (S55). The coordinates are stored as XUL and YUL (S56). Next, the user, preferably by a prompt, selects the lower-right corner of the tab image using the right mouse button (S57). Then the values for XLAST and YLAST are initialized to be the same as the upper-left corner, XUL and YUL, (S58).

Figure 13:
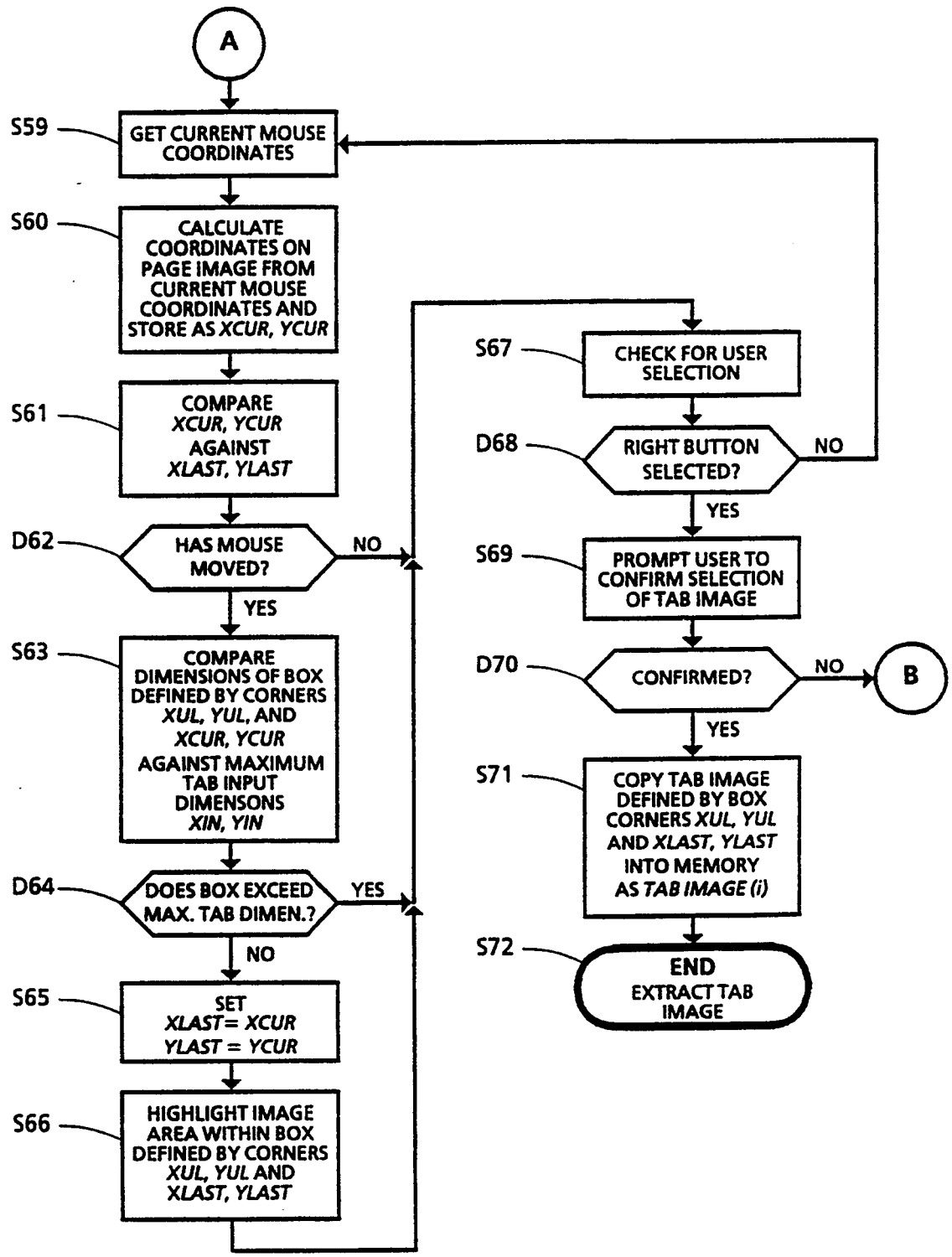
FIG. 13 is a continuation of FIG. 12 continuing the expansion of the S6 step shown in FIG. 9.

As continued in FIG. 13, the current mouse coordinates are retrieved (S59) and are used to calculate the coordinates on the page image that are then stored as (XCUR, YCUR) (S60). The coordinates (XCUR, YCUR) are compared against the (XLAST, YLAST) coordinates to determine if the mouse has moved (S61). If the mouse has moved from the previous mouse location (D62), then the dimensions of the box defined by corners (XUL, YUL) and (XCUR, YCUR) are compared against the maximum tab input dimensions XIN and YIN (S63) to determine if the box exceeds the maximum allowable tab input image dimensions (D64). If the box does not exceed the maximum tab dimension, then XLAST is set to equal XCUR, and YLAST is set to equal YCUR (S65). The image area within the box defined by (XUL, YUL) and (XLAST, YLAST) is highlighted (S66) to show the user the image area currently being defined. However, if the box does exceed the maximum allowable tab image input dimension (D64), then the system leaves the user defined box as the tab image area and skips steps S65 and S66. Each time the mouse coordinates are obtained (S59), the system will check to see if the user has made a selection (i.e. mouse button pressed) (S67). This check (S67) happens after determining that the mouse has not moved (D62), after determining that the maximum tab dimensions have been exceeded (D64) or after highlighting the newly defined area (S66) when the maximum tab dimensions have not been exceeded (D64). If the right mouse button is not selected (D68), then the user goes back to step S59 and repeats the process (S59-D68) until the right mouse button is selected. Once the right button is selected (D68), then the user is prompted to confirm the selection of the tab image (S69) as highlighted. If it is not confirmed (D70) then the user is sent back to step S52 to start the box definition process all over again. However, if the selection is confirmed (D70), then the tab image defined by box corners (XUL, YUL) and (XLAST, YLAST) is copied into memory as tab image (i) (S71) and the tab image extraction ends at step S72.

Figure 14:
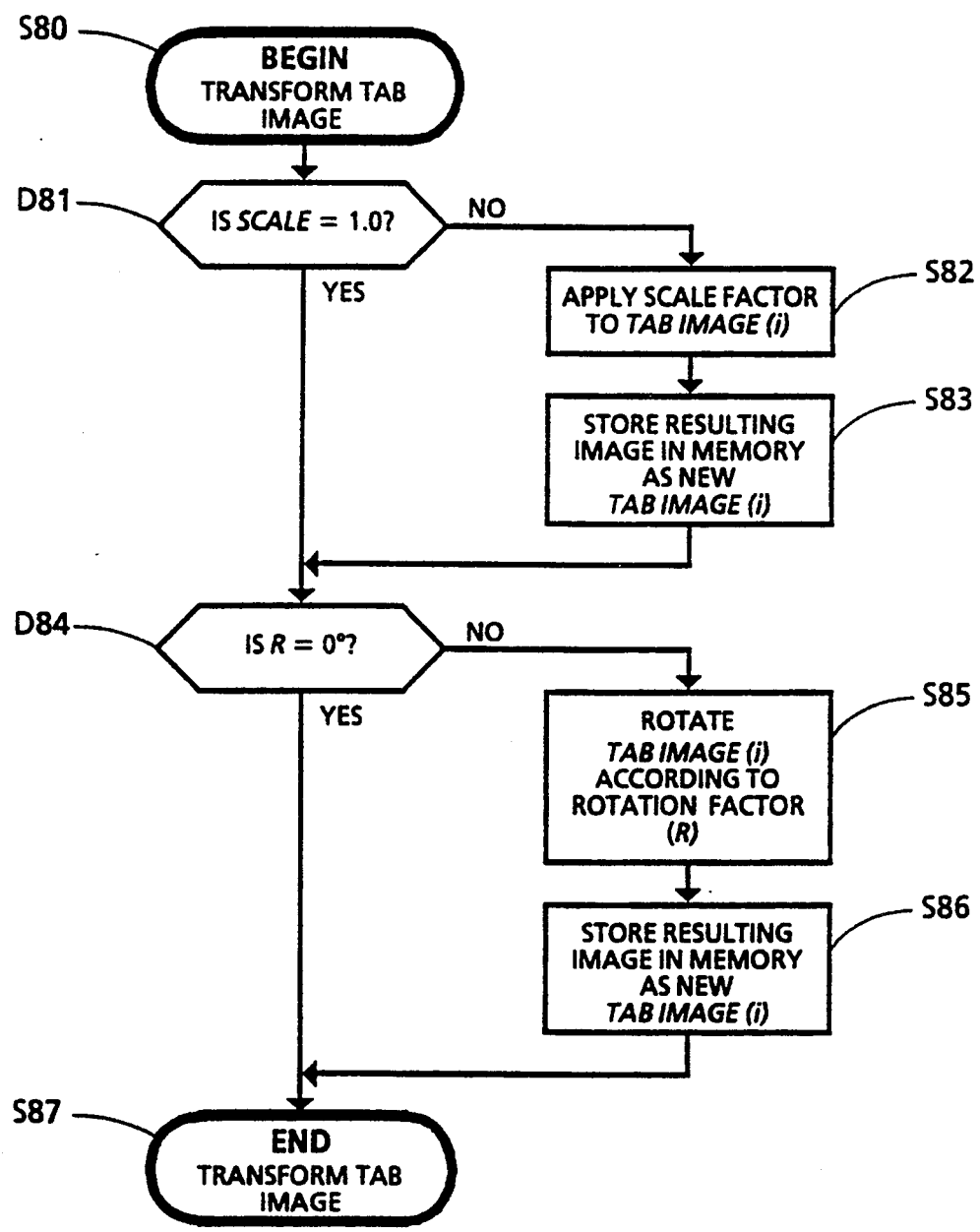
FIG. 14 is an expansion of the S7 step shown in FIG. 9.

Once the tab image has been extracted, the tab image is transformed according to imaging parameters (S7) as further detailed in FIG. 14. The tab image transformation (S80) begins by determining if scaling is required, for example, when a scale factor is not 1.0 (D84). If the scale factor is not 1.0 (i.e greater or less than 1.0) then the tab image (i) is scaled according to the scale factor (S82) and the resulting image is stored in memory as new tab image (i) (S83). If the scale factor is 1.0, then the scaling steps S82 and S83 are bypassed. Whether or not the tab image is scaled, it is additionally determined whether or not rotation is required (D84). If the value of the rotation factor is equal to 0° (D84), then the tab image transformation is complete (S87). However, if the rotation does not equal 0°, then the tab image (i) is rotated according to rotation factor (S85). The resulting image is stored in memory as new tab image (i) (S86), and the tab image transformation is complete (S87).

In FIG. 9, each tab image that is extracted and transformed is sequentially stored in the system memory (S8). To continue the tab extraction and transformation (D9), steps S6, S7 and S8 are repeated until the desired quantity of tabs has been extracted, transformed, and stored. The number of tab images that may be involved is unlimited as the tab image is represented by (i), where i is equal to one to "n" tabs. In a preferred embodiment, as shown in FIG. 9, the order of the tab sequence can be changed if the order is not correct (D10) by editing the order of the tab sequence (S16). However, in another embodiment, steps D10 and S16 can be optional. When the order of the tab sequence is correct, the tab images are retrieved from the memory and applied sequentially to the tab pages in the print job (S11).

Figure 15:
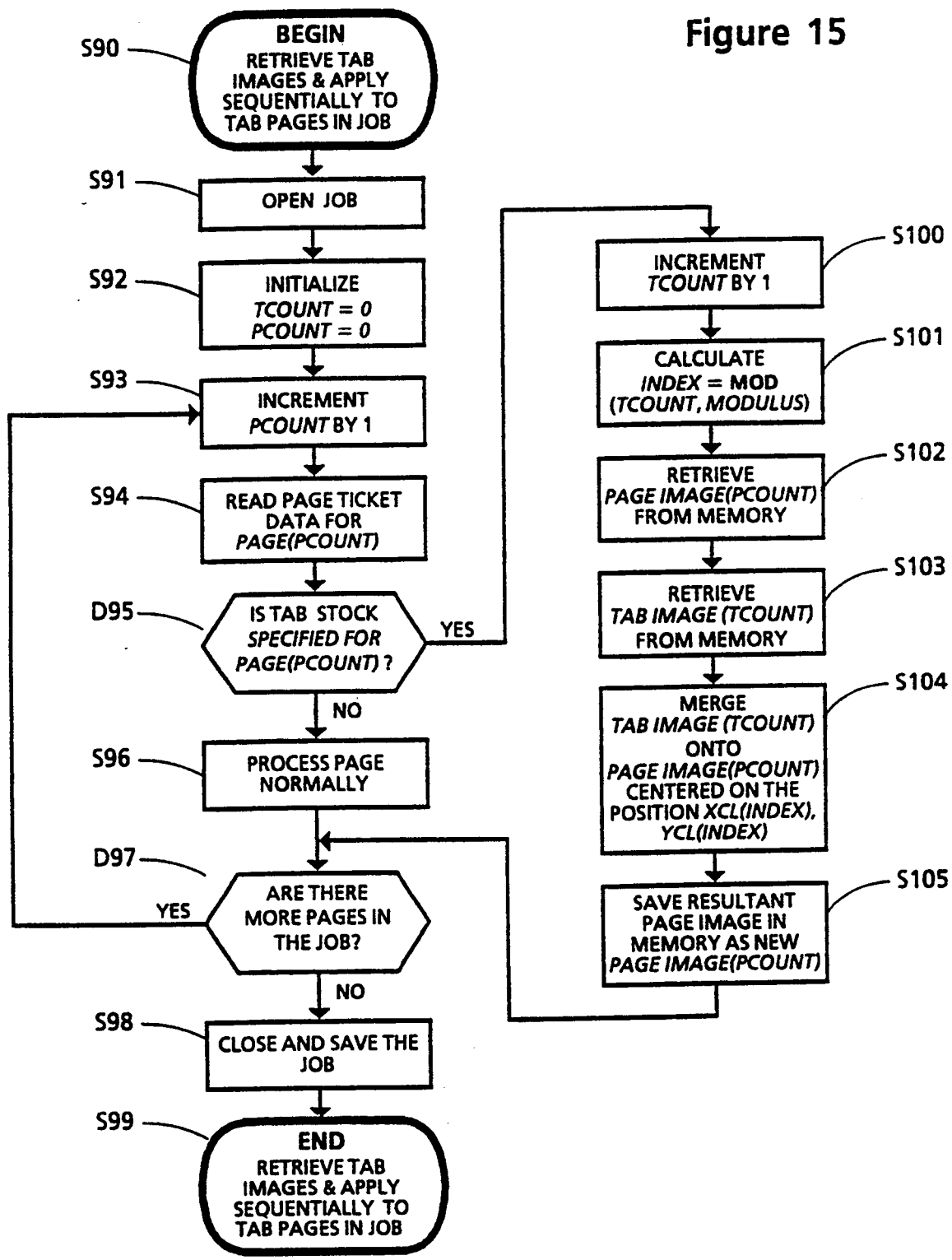
FIG. 15 is an expansion of the S11 step shown in FIG. 9.

FIG. 15 shows the retrieval and application of tab images to the tab pages in the print job (S90). To do so, the print job must be opened (S91). Although the embodiment shown in FIG. 15 applies tab stock sequentially in the pattern in which it is loaded in a paper tray of the system. It is understood that the user could specify a specific instance in a pattern for any particular tab page. For example, in one embodiment, the system would have a means to either purge or bypass unwanted instances of tab stock so that the proper matching of the tab position could be acquired at the desired time. Once the job is open, a tab counter, TCOUNT, and a page counter, PCOUNT, are initialized to equal zero (S92). The page counter, PCOUNT, is then incremented by 1 (S93). The page ticket parameters for the particular page image indicated by the page counter, PCOUNT, are read from memory, as shown in step S94. If the page ticket parameters indicate that tab stock is specified for the page image, PAGE(PCOUNT), in step (D95), then the tab counter, TCOUNT, is incremented by 1 (S100). An INDEX is calculated that represents the ordered position within the pattern of the modulus. The INDEX is set to be a remainder that results from the division of TCOUNT by MODULUS (S101). The page image (PCOUNT) (S102) and the tab image (TCOUNT) (S103) are retrieved from the memory. The tab image (TCOUNT) is merged onto the page image (PCOUNT) by centering the tab image on the page image at position XCL(INDEX), YCL (INDEX) in accordance with the tab parameter file in step S104. The resultant page image is saved in memory as new page image (PCOUNT) in step S105. However, in step D95, if the tab stock is not specified for PAGE(PCOUNT), then the page image is processed accordingly (S96). If there are more page images in the job, then steps S93 through S96 are repeated, however, if there are no more page images in the job, then the job is closed, the print job including the page images is saved (S98), and the retrieval and application of tab images is complete (S99).

Accordingly, the preferred embodiments of the invention as set forth herein are intended to be illustrative, not limiting. Various changes may be made without departing from the spirit and scope of the invention as defined in the following claims.

What is claimed is:

1. A method for producing tab images for a print job, comprising the steps of:
   supplying image data comprising page images;
   supplying a type of tab stock cut having at least one tab extension;
   supplying tab image parameters based in part on the type of tab stock cut;
   selecting at least one tab image from a portion of any one of the page images;
   processing the tab image according to the tab image parameters; and
   storing the at least one processed tab image in a sequential order corresponding to a tab sequence for the type of tab stock cut.

2. The method for producing tab images according to claim 1, wherein the step of supplying tab image parameters further comprises the steps of:
   supplying tab extension dimensions for the at least one tab extension; and
   storing the tab extension dimensions.

3. The method for producing tab images according to claim 1, wherein the step of supplying tab image parameters further comprises the steps of:
   supplying a final orientation of the tab image for printing on a sheet of tab stock; and
   storing the final orientation.

4. The method for producing tab images according to claim 1, wherein the step of supplying tab image parameters further comprises the steps of:
   supplying an input orientation of the tab image for printing on a sheet of tab stock; and
   storing the input orientation.

5. The method for producing tab images according to claim 1, wherein the step of supplying tab image parameters further comprises the step of:
   supplying a scale factor for scaling the tab image.

6. The method for producing tab images according to claim 1, wherein the step of supplying tab image parameters further comprises the step of:
   determining a rotation for the tab image based on an input orientation and a final orientation.

7. The method for producing tab images according to claim 1, wherein the step of selecting a tab image further comprises the steps of:
   supplying tab image dimensions; and
   storing the tab image dimensions.

8. The method for producing tab images according to claim 7, further comprising the step of:
   determining whether the tab image dimensions exceed maximum tab dimensions.

9. The method for producing tab images according to claim 8, further comprising the step of:
   adjusting the tab image dimensions based on the step of determining whether the tab image dimensions exceed the maximum tab dimensions.

10. The method for producing tab images according to claim 1, wherein the step of selecting the image data further comprise the step of:
    selecting the tab image from a display of at least part of the image data.

11. The method for producing tab images according to claim 1, wherein the step of processing the tab image according to the tab image parameters further comprises the steps of:
    supplying a predetermined scale factor;
    scaling the tab image by the predetermined scale factor; and
    storing the scaled tab image.

12. The method for producing tab images according to claim 1, further comprising the steps of:
    retrieving said stored processed tab image;
    applying said retrieved tab image to a tab page image; and
    storing said tab page image.

13. The method for producing tab images according to claim 12, further comprising the step of:
    printing said tab page image on a sheet of tab stock.

14. The method of producing tab images according to claim 1, further comprising the step of:
    editing the sequentially stored processed tab images.

15. An electronic reprographic printing system for printing tab images on tab stock, comprising:
    means for supplying image data;
    means for supplying a type of tab stock cut having a tab extension;
    means for supplying tab image parameters based in part on the type of tab stock cut supplied;
    means for selecting at least one tab image from a portion of any one of the page images;
    means for processing the tab image according to the tab image parameters; and
    means for storing the at least one processed tab image in a sequential order corresponding to a tab sequence for the type of tab stock cut.

16. The printing system according to claim 15, further comprising:
means for supplying tab extension dimensions for the at least one tab extension, and said tab extension dimensions being stored in said storage means.

17. The printing system according to claim 15, further comprising:
means for supplying a tab image final orientation for printing on a sheet of tab stock, said tab image final orientation being stored in said storage means.

18. The printing system according to claim 15, further comprising:
means for supplying a tab image input orientation for printing on a sheet of tab stock, said tab image input orientation being stored in said storage means.

19. The printing system according to claim 15, further comprising:
means for supplying a scale factor for scaling the tab image; and
means for scaling said tab image based on the scale factor.

20. The printing system according to claim 15, further comprising:
means for determining a tab image rotation factor based on an input orientation and a final orientation.

21. The printing system according to claim 15, further comprising:
means for supplying tab image dimensions, said tab image dimensions being stored in said storage means.

22. The printing system according to claim 21, further comprising:
means for determining whether the tab image dimensions exceed maximum tab dimensions.

23. The printing system according to claim 22, further comprising means for adjusting the stored tab image dimensions based on the means for determining whether the tab image dimensions exceed the maximum tab dimensions.

24. The printing system according to claim 23, further comprising:
means for scaling said stored tab image based on the means for adjusting the stored tab image dimensions.

25. The printing system according to claim 15, further comprising:
means for displaying at least part of the image data for selecting the tab image.

26. The printing system according to claim 15, further comprising:
means for editing the sequentially stored processed tab images.

27. The printing system according to claim 15, further comprising:
means for retrieving said stored processed tab image;
means for applying said retrieved tab image to a tab page image, said tab page image being stored in said storage means.

28. The printing system according to claim 27, further comprising:
means for printing said tab page image on a sheet of tab stock.

* * * * *